(12) United States Patent
Mar

(10) Patent No.: US 7,436,389 B2
(45) Date of Patent: Oct. 14, 2008

(54) METHOD AND SYSTEM FOR CONTROLLING THE OUTPUT OF A DIFFRACTIVE LIGHT DEVICE

(76) Inventor: Eugene J Mar, 1670 NW. Emperor Dr., Corvallis, OR (US) 97330

( * ) Notice: Subject to any disclaimer, the term of this patent is extended or adjusted under 35 U.S.C. 154(b) by 663 days.

(21) Appl. No.: 10/903,537

(22) Filed: Jul. 29, 2004

(65) Prior Publication Data

US 2006/0022966 A1 Feb. 2, 2006

(51) Int. Cl.
*G09G 3/34* (2006.01)
(52) U.S. Cl. .................. 345/108; 345/84; 345/105; 345/204
(58) Field of Classification Search .......... 345/84, 345/87, 104, 105, 106, 204, 205, 214; 348/744, 348/759, 770, 771
See application file for complete search history.

(56) References Cited

U.S. PATENT DOCUMENTS

| 5,986,796 | A * | 11/1999 | Miles ................... 359/260 |
| 6,055,090 | A | 4/2000 | Miles |
| 6,348,907 | B1 * | 2/2002 | Wood ................... 345/84 |
| 6,498,596 | B1 | 12/2002 | Nakamura |
| 6,535,187 | B1 * | 3/2003 | Wood ................... 345/84 |
| 6,747,625 | B1 | 6/2004 | Han |
| 6,747,785 | B2 * | 6/2004 | Chen et al. ........... 359/291 |
| 6,791,735 | B2 * | 9/2004 | Stappaerts ........... 359/245 |
| 6,850,352 | B1 * | 2/2005 | Childers ............... 359/237 |
| 6,963,440 | B2 * | 11/2005 | Martin et al. ........ 359/290 |
| 6,970,031 | B1 * | 11/2005 | Martin et al. ........ 327/382 |
| 7,072,093 | B2 * | 7/2006 | Piehl et al. .......... 359/290 |
| 7,111,941 | B2 * | 9/2006 | Allen et al. ........... 353/31 |
| 7,253,794 | B2 * | 8/2007 | Wood ................... 345/84 |
| 2002/0054424 | A1 | 5/2002 | Miles |
| 2004/0056983 | A1 | 3/2004 | Deen |
| 2004/0090446 | A1 | 5/2004 | Lee et al. |

OTHER PUBLICATIONS

International Search Report for Application No. PCT/US2005/025009. Report issued Jun. 6, 2006.

* cited by examiner

*Primary Examiner*—My-Chau T Tran

(57) ABSTRACT

A method and system for controlling a color of light output by a diffractive light device (DLD device). The color is determined by a gap voltage applied to the DLD device. During each of a number of time frames, one of a number of control bits in a control word is sent to bit line logic corresponding to the DLD device. Each of the control bits represents a gap voltage level. The applied gap voltage is then adjusted to the gap voltage level represented by the one of the number of the control bits.

16 Claims, 7 Drawing Sheets

METHOD AND SYSTEM FOR CONTROLLING THE OUTPUT OF A DIFFRACTIVE LIGHT DEVICE

BACKGROUND

Micro-electromechanical systems (MEMS) are systems which are typically developed using thin film technology and include both electrical and micro-mechanical components. MEMS devices are used in a variety of applications such as optical display systems, pressure sensors, flow sensors, and charge-control actuators. MEMS devices use electrostatic force or energy to move or monitor the movement of micro-mechanical electrodes which can store charge. In one type of MEMS device, to achieve a desired result, a gap distance between electrodes is controlled by balancing an electrostatic force and a mechanical restoring force.

MEMS devices designed to perform optical functions have been developed using a variety of approaches. According to one approach, a deformable deflective membrane is positioned over an electrode and is electrostatically attracted to the electrode. Other approaches use flaps or beams of silicon or aluminum which form a top conducting layer. With optical applications, the conducting layer is reflective while the deflective membrane is deformed using electrostatic force to direct light which is incident upon the conducting layer.

More specifically, a group of MEMS called Diffractive Light Devices (DLDs) are often used as spatial light modulators (SLMs) in display systems. A DLD array may have an array of individual cells that are each independently controllable to receive light and output light having a spectral distribution that is peaked about a particular wavelength such as red, green, blue, cyan, magenta, yellow, violet, orange, or other colors.

Each cell in a DLD array may include an optical cavity with a dimension normal to the array of cells that is responsive to the application of voltage across opposing pixel plates that help to define the cavity. A DLD cell produces colors based on the precise spacing of the pixel plates. This spacing is the result of a balance of two forces: electro-static attraction based on voltage and charge on the plates, and a spring constant of one or more "support structures" maintaining the position of the pixel plate away from the electrostatically charged plate. The gap distance may be controlled by applying a voltage to the pixel plates, where the control voltage is increased to decrease the gap distance, and vice-versa. However, it is often difficult to stabilize the voltage before it is applied to the pixel plates.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

A method and system for controlling a color of light output by a light diffracting mechanism are described herein. The light diffracting mechanism may be a diffractive light device (DLD device), for example. The color is determined by a gap voltage applied to the DLD device. During each of a number of time frames, an image processing unit or other bit driver sends one of a number of control bits in a control word to bit line logic corresponding to the DLD device. Each of the control bits represents a gap voltage level. After each control bit is sent to the bit line logic, the bit line logic adjusts the gap voltage that is applied to the DLD device to the gap voltage level represented by the recently sent control bit.

In the following description, for purposes of explanation, numerous specific details are set forth in order to provide a thorough understanding of the present system and method. It will be apparent, however, to one skilled in the art that the present system and method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

As used herein and in the appended claims, the terms "diffractive light device" and "DLD" are meant to be broadly understood as any device or structure that selectively produces color by controlling the gap size between a reflective surface and one or more charge plates by balancing two forces: electro-static attraction based on voltage and charge on the plates, and a spring constant of one or more "support structures" supporting the reflective surface. Additionally, the term "Micro-Electro Mechanical System" or "MEMS" is meant to be understood broadly as describing any very small (e.g., micro) mechanical device that may be constructed on a single semiconductor chip and which may be fabricated, for example, using integrated circuit (IC) batch-processing techniques.

Furthermore, the term "display system" will be used herein and in the appended claims, unless otherwise specifically denoted, to refer to a projector, projection system, image display system, television system, video monitor, computer monitor system, or any other system configured to display an image. The image may be a still image, a series of images, or motion picture video. The term "image" will be used herein and in the appended claims, unless otherwise specifically denoted, to refer broadly to a still image, series of images, motion picture video, or anything else that is displayed by a display system.

Figure 1:
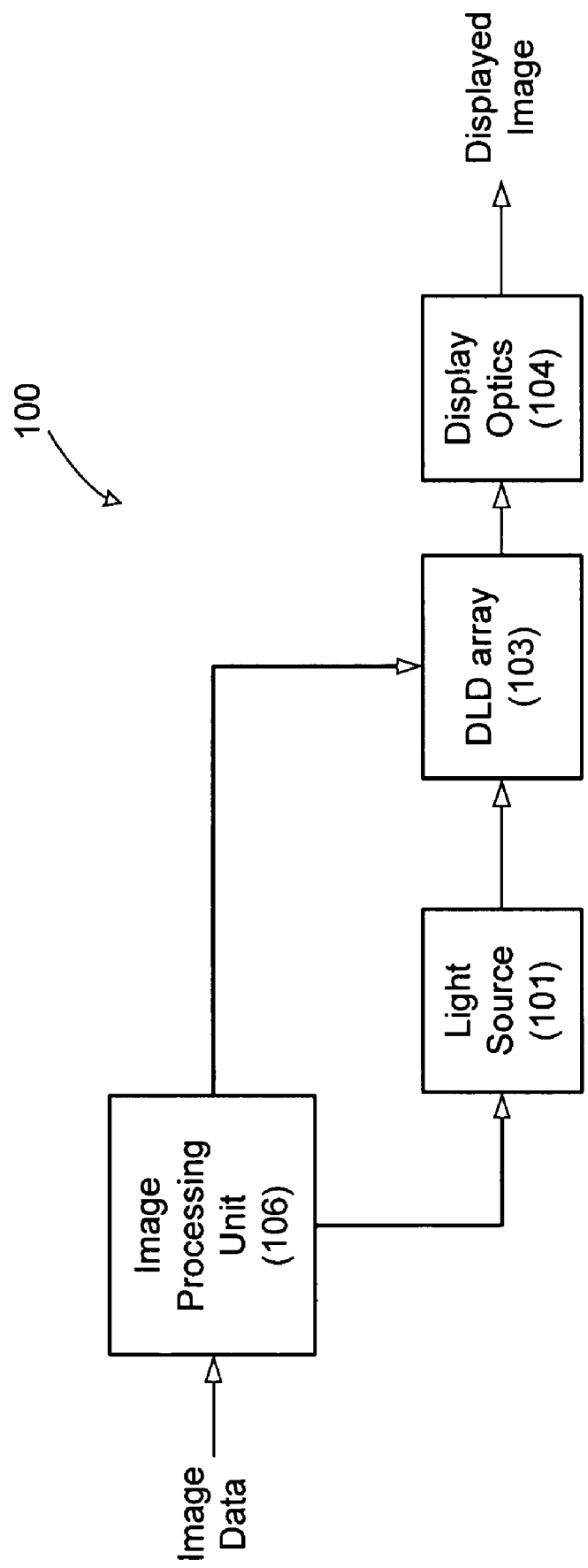
FIG. 1 illustrates an exemplary display system according to one exemplary embodiment.

FIG. 1 illustrates an exemplary display system (100) according to an exemplary embodiment. The components of FIG. 1 are exemplary only and may be modified, changed, or added to as best serves a particular application. As shown in FIG. 1, image data is input into an image processing unit (106). The image data defines an image that is to be displayed by the display system (100). While one image is illustrated and described as being processed by the image processing unit (106), it will be understood by one skilled in the art that a plurality or series of images may be processed by the image processing unit (106). The image processing unit (106) performs various functions including controlling the illumination of a light source (101) and controlling a DLD array (103). The DLD array (103) will be explained in more detail below.

As shown in FIG. 1, the light source (101) provides a beam of light to the DLD array (103). The light source (101) may be, but is not limited to, a high pressure mercury lamp. The DLD array (103) of FIG. 1 modulates the light output by the light source (101) based on input from the image processing unit (106) to form an image bearing beam of light that is eventually displayed or cast by display optics (104) on a viewing surface (not shown). The display optics (104) may comprise any device configured to display or project an image. For example, the display optics (104) may be, but are not limited to, a lens configured to project and focus an image onto a viewing surface. The viewing surface may be, but is not limited to, a screen, television, wall, liquid crystal display (LCD), or computer monitor.

Figure 2:
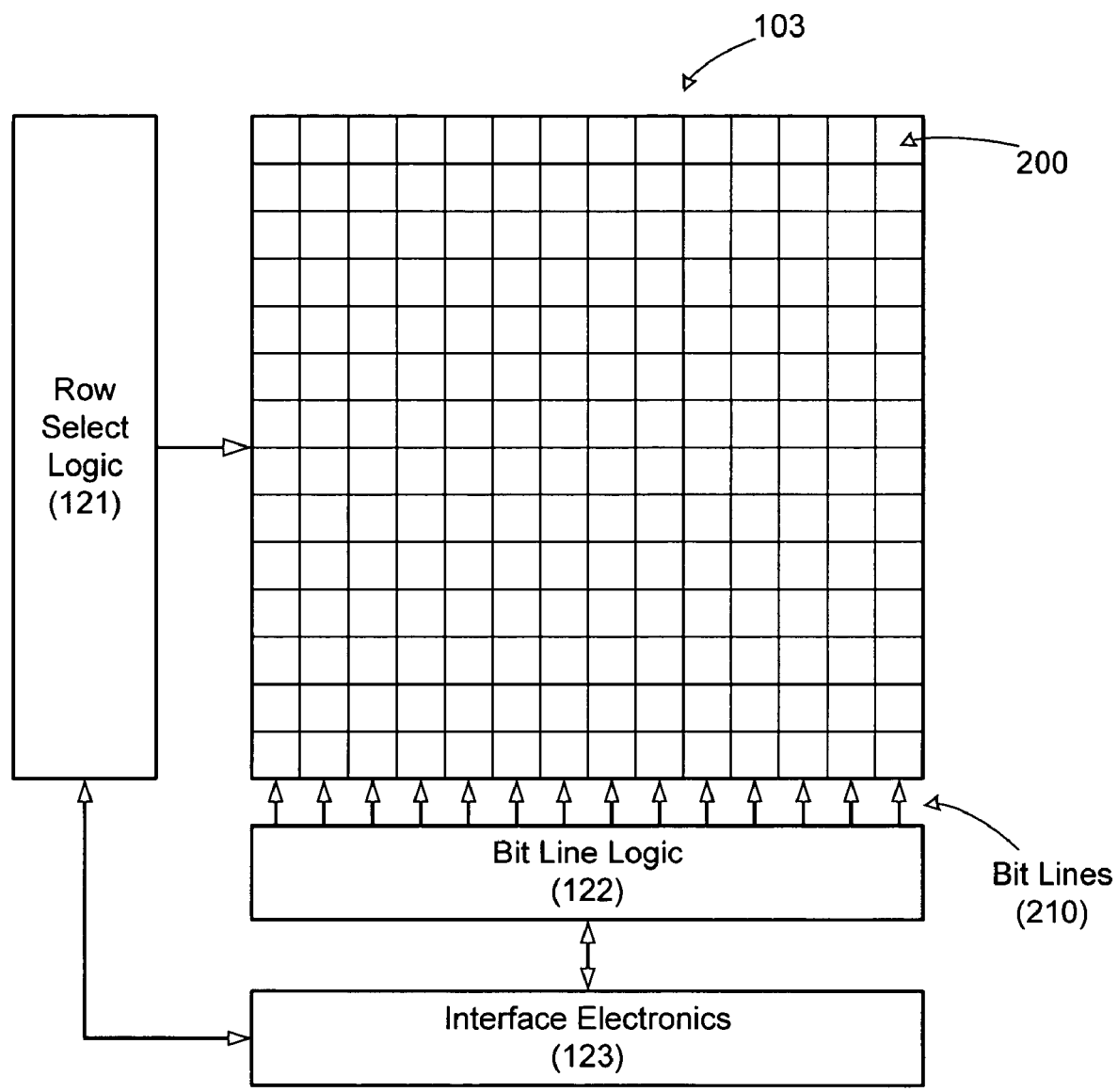
FIG. 2 illustrates an exemplary DLD array according to one exemplary embodiment.

An exemplary DLD array (103) is illustrated in FIG. 2. The exemplary DLD array (103) includes a number of individual DLD devices or cells (200). As used herein and in the appended claims, unless otherwise specifically denoted, the terms "DLD device," "DLD cell," and "DLD pixel element" will be used interchangeably to refer to an individual DLD device that is independently controllable to receive white light and output light having a spectral distribution that is peaked about a particular wavelength. The individual DLD devices (200) form pixels which may be used to produce an image perceived by a human viewer.

FIG. 2 illustrates control circuitry (121, 122) configured to control the operation of the individual DLD devices (200). For example, row select logic (121) and bit line logic (122) are configured to apply voltages to each of the DLD devices (200) in a particular row of the DLD array (103) such that each of the DLD devices (200) outputs light having a desired color. In one embodiment, the bit line logic (122) applies voltages to each of the DLD devices (200) in a particular row by charging a number of bit lines (210) to desired voltage levels. Interface electronics (123) may also be included in the display system (100; FIG. 1) to interface between the other components of the display system (100; FIG. 1) and the control logic (121, 122). In one embodiment, some or all of the control circuitry (121, 122) may be implemented in an application specific integrated circuit (ASIC), field programmable gate array (FPGA), or in some other hardware, software, or combination thereof.

The bit line logic (122) may be stand alone circuitry, as shown in FIG. 2, according to an exemplary embodiment. In an alternative embodiment, the bit line logic (122) may be integrated into the DLD array (103) circuitry.

Figure 3:
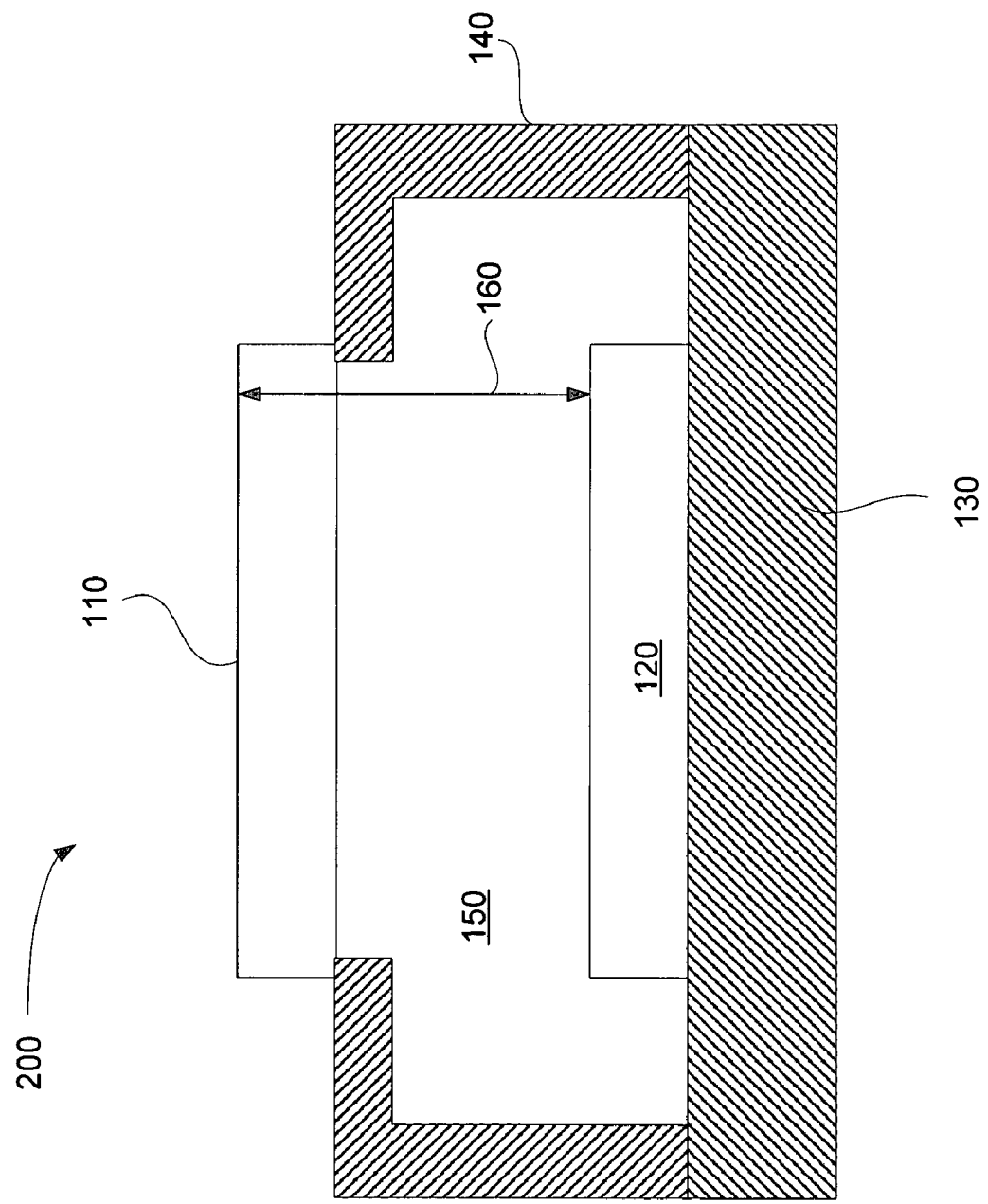
FIG. 3 is a diagram illustrating an exemplary DLD device according to one exemplary embodiment.

FIG. 3 is a diagram illustrating an exemplary DLD device (200) according to one exemplary embodiment. In the exemplary embodiment, the DLD device (200) displays, at least partially, a pixel of a displayable image. The DLD device (200) may include a top pixel plate or reflector (110), a bottom pixel plate or reflector (120), a support structure (130), and a spring mechanism (140). As used herein and in the appended claims, the terms "pixel plate" and "reflector" will be used interchangeably to refer to the top and bottom reflectors (110, 120). A resonant optical cavity (150) is defined between the reflectors (110, 120). Thus, the two reflectors (110, 120) are separated by a variable gap distance (160). The top reflector (110) may be semi-transparent or semi-reflective, with the bottom reflector (120) being highly or completely reflective. The spring mechanism (140) may be any suitable flexible material, such as a polymer, that has linear or non-linear spring functionality.

The optical cavity (150) can be adjusted to select a visible wavelength at a particular intensity using optical interference. Depending on the configuration of DLD device (200), the optical cavity (150) can either reflect or transmit the wavelength at the desired intensity. That is, the optical cavity (150) can be reflective or transmissive in nature. No light is generated by the optical cavity (150). Accordingly, the DLD device (200) relies on ambient light or other external sources of light. The visible wavelength transmitted by the optical cavity (150) and its intensity are dependent on the gap distance (160) between the top and bottom reflectors (110, 120). Accordingly, the optical cavity (150) can be tuned to output light having a spectral distribution that is peaked about a particular wavelength such as red, green, blue, cyan, magenta, yellow, violet, orange, and/or other colors by controlling the gap distance (160).

FIG. 3 shows that the DLD device (200) may include a support structure (130) and a spring mechanism (140). The support structure (130) and the spring mechanism (140) are configured to allow the gap distance (160) to vary when an appropriate amount of charge has been stored on the reflectors (110, 120), such that a desired wavelength at a desired intensity is selected. In one embodiment, a DLD device's (200) corresponding bit line (210) supplies the charge that is stored on the reflectors (110, 120).

As mentioned, a DLD device (200) may be tuned to output light having a spectral distribution that is peaked about a particular wavelength by applying a variable analog voltage to the DLD device (200). In one embodiment, the applied voltage determines the gap distance (160) between the top and bottom reflectors (110, 120) of a DLD device (200). Hence, the term "gap voltage" will be used herein and in the appended claims to refer to the voltage that is applied to the DLD device (200). In one embodiment, increasing the gap voltage decreases the gap distance (160) and decreasing the gap voltage increases the gap distance (160).

Figure 4:
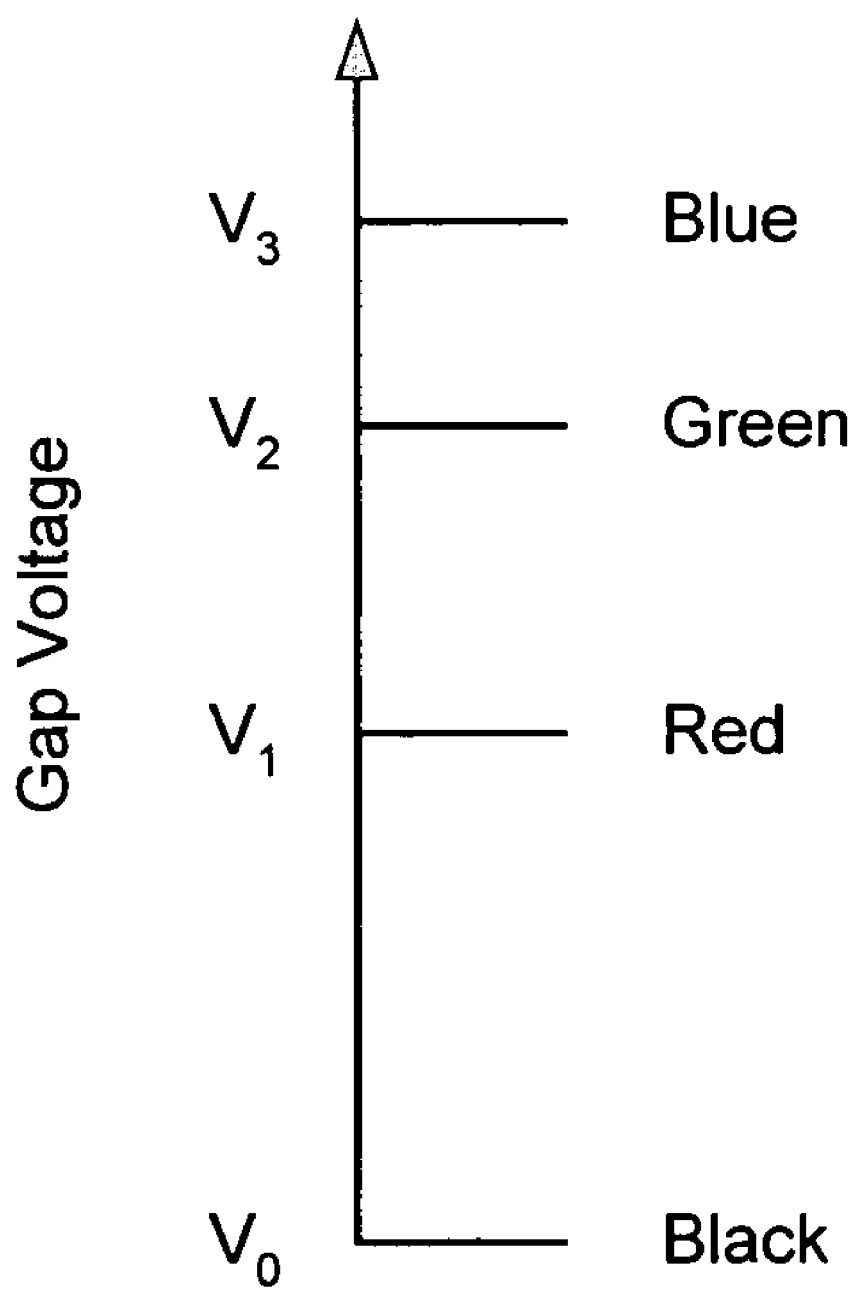
FIG. 4 shows that each of four colors may be associated with one of four gap voltage levels according to one exemplary embodiment.

In one embodiment, the gap voltage may be varied between a number of distinct voltage levels such that the DLD device (200) outputs one of a number of distinct colors. For example, as shown in FIG. 4, if a pixel is to have one of four different colors (e.g. black, red, green, and blue), the gap voltage applied to the pixel's corresponding DLD device (200) may vary between four different gap voltage levels ($V_0$ through $V_3$). FIG. 4 shows that each of these four colors is associated with one of four gap voltage levels ($V_0$ through $V_3$). For illustrative purposes, black may be associated with the gap voltage level $V_0$, red may be associated with the gap voltage level $V_1$, green may be associated with the gap voltage level $V_2$, and blue may be associated with the gap voltage level $V_3$. Hence, if a DLD device (200) is to output green light during a particular time period or frame, a gap voltage level equal to $V_2$ is applied to the DLD device (200).

It will be understood that the spacing between the voltage levels $V_0$ through $V_3$ of FIG. 4 is illustrative only. In practice, the voltage spacing depends in part on the dimensions and physical characteristics of the DLD device (200) and will vary as best serves a particular application. Furthermore, the four colors shown in FIG. 4 are illustrative of the many different sets of colors that a DLD device (200) may be configured to produce. For example, the DLD device (200) may be configured to produce red, green, blue, cyan, magenta, yellow, violet, orange, and/or other colors. More-over, in the following examples, it will be assumed that a DLD device (200) is to output one of four different colors for ease of illustration only. In one embodiment, a DLD device (200) may output one of any number of different colors. Hence, the gap voltage may be configured to vary between any number of different gap voltage levels.

In one embodiment, the image processing unit (106) or, alternatively, any bit line driver, may be configured to generate and send an n-bit control word representing a gap voltage level to the control circuitry (121, 122) such that a particular DLD device (200) outputs a color corresponding to the gap voltage level during a specified time frame. The control word may include one or more control bits and may be sent to the control circuitry (121-122) during a single time frame or during multiple time frames, as will be explained below. The control circuitry (121, 122) is configured to use the control bits to charge the DLD device's (200) corresponding bit line (210) to the voltage level so indicated by the control bits. The term "image processing unit" will be used herein and in the appended claims to broadly encompass any processor, driver, or other hardware and/or software component configured to generate and send an n-bit control word representing a gap voltage level to the control circuitry (121, 122).

In one embodiment, all of the DLD devices (200) in a particular row of the DLD array (103) are updated during the same time frame. It will be understood that any references to "updating a DLD device" herein and in the appended claims, unless otherwise specifically denoted, refer to sending a control word to the control logic (121, 122) such that the DLD device outputs a color corresponding to the gap voltage level so indicated by the control word. Likewise, any references to "updating a row of DLD devices" herein and in the appended claims, unless otherwise specifically denoted, refer to sending a control word to the control logic (121, 122) for each of the DLD devices in the row such that each of the DLD devices outputs a color corresponding to the gap voltage levels so indicated by the control words.

Figure 5:
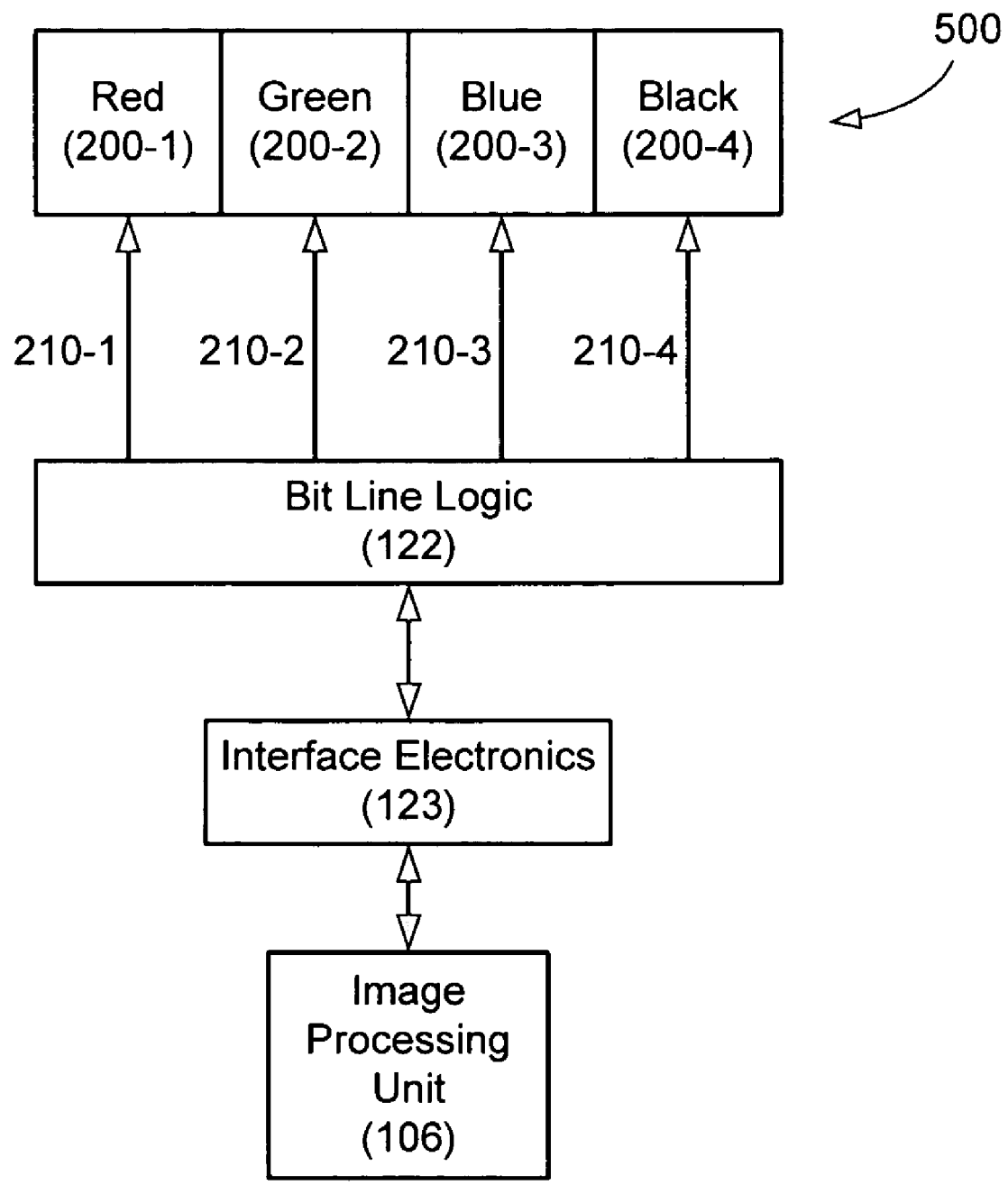
FIG. 5 illustrates an exemplary row in a DLD array of four DLD devices that are updated during the same time period or frame according to one exemplary embodiment.

FIG. 5 illustrates an exemplary row (500) in a DLD array of four DLD devices (200) that are updated during the same time period or frame. Four DLD devices (200) are shown for illustrative purposes only. It will be understood that a row (500) in a DLD array may have any number of DLD devices. As shown in FIG. 5, each of the DLD devices (200) is to output light having one of the four colors shown in FIG. 4. DLD device (200-1) is to output red light, DLD device (200-2) is to output green light, DLD device (200-3) is to output blue light, and DLD device (200-4) is to have a black, or off, state. Each of the DLD devices (200) has a corresponding bit line (210). The bit lines (210), as will be explained below, are charged by the bit line logic (122) such that the DLD devices (200) have the gap voltage levels necessary to output the desired colors.

As explained previously, the image processing unit (106) communicates with the bit line logic (122) via interface electronics (123), for example. In one exemplary embodiment, the image processing unit (106) updates the DLD devices (200) by sending a control word to the bit line logic (122). The bit line logic (122) may then charge the bit lines (210) to the gap voltage levels so indicated by the control word.

As mentioned, the n-bit control word may include a number of control bits. The control word may represent one of a number of possible gap voltage levels. In general, if there are $2^n$ possible gap voltage levels, each of these $2^n$ gap voltage levels may be represented by a single n-bit control word. Thus, if there are four possible gap voltage levels, as shown in FIG. 4, each of the gap voltage levels may be represented by a 2-bit control word. As will be recognized by one skilled in the art, an n-bit control word includes a most significant bit (MSB) and a least significant bit (LSB). The MSB is the left-most bit in the n-bit control word and the LSB is the right-most bit in the n-bit control word.

For example, $V_0$ (black) may be represented by "00," $V_1$ (red) may be represented by "01," $V_2$ (green) may be represented by "10," and $V_3$ (blue) may be represented by "11." Referring again to FIG. 5, the image processing unit (106) may be configured to generate and send one of these four 2-bit control words to the bit line logic (122) for each of the DLD devices (200). For example, the image processing unit (106) may generate and send the 2-bit control word "01" to the bit line logic (122) for the DLD device (200-1). The bit line logic (122) may then charge the bit line (210-1) to a gap voltage level equal to $V_1$ so that the DLD device (200-1) outputs red light. However, if the row (500) has a large number of DLD devices (200), it can be difficult for the bit line logic (122) to charge all of the bit lines (210) and stabilize the gap voltages during a single frame period before applying the gap voltages to the DLD devices (200). Further timing complications may also arise if there are two or more bits in the control words.

In one exemplary embodiment, the image processing unit (106) may be configured to send the control words to the bit line logic (122) in single bit planes starting with the MSBs and ending with the LSBs of the control words. In other words, the image processing unit (106) first sends to the bit line logic (122) the MSB of each of the control words corresponding to a row of DLD devices (200). The image processing unit (106) then sends the next significant bit of each control words corresponding to the row of DLD devices (200) of the in the same manner. The process is repeated until the image processing unit (106) sends to the bit line logic (122) the LSB of each of the control words corresponding to the row of DLD devices (200). The timing of the sending of each of the bits in the control word may be configured such that the pixels formed by the DLD devices (200) appear to have only the desired color as indicated by the control word.

In the exemplary embodiment, each of the bits in the control words may represent one of two gap voltage levels. For example, with reference to the gap voltage levels of FIG. 4, the MSB may represent $V_0$ or $V_1$, and the LSB may represent $V_2$ or $V_3$. Accordingly, by sending a control word to the bit line logic (122) one bit at a time starting with the MSB and ending with the LSB, the bit line logic (122) may incrementally charge the bit line (210) as each control bit is received until the bit line (210) is fully charged to the final gap voltage level as indicated by the entire control word. As mentioned, the bits may be sent such that the pixels formed by the DLD devices (200) appear to have only the desired color as indicated by the control word.

For example, referring again to FIG. 5, a 2-bit control word may be sent to the bit line logic (122) in single bit increments such that a DLD device (200) outputs red, green, blue, or black. For illustrative purposes only, the control word will represent $V_2$ (green) in the following example such that the DLD device (200-2) outputs the color green. In one embodiment, the MSB is sent to the bit line logic (122) first. The MSB may be sent during a first frame, for example. The MSB may represent the gap voltage levels $V_0$ or $V_1$. For example, a bit value of "0" may represent the gap voltage level $V_0$ and a bit value of "1" may represent the gap voltage level $V_1$. Because the gap voltage level $V_1$ is closer to the desired gap voltage level of $V_2$ than is $V_0$, the image processing unit (106) sends a "1" as the MSB such that the bit line logic (122) initially charges the bit line (210-2) to the gap voltage level $V_1$.

Continuing in the present example, after the MSB is sent to the bit line logic (122), the image processing unit (106) sends the LSB to the bit line logic (122). The LSB may be sent during a frame subsequent to the first frame. The LSB may represent, for example, the gap voltage levels $V_2$ or $V_3$. For example, "0" may represent the gap voltage level $V_2$ and a bit value of "1" may represent the gap voltage level $V_3$. Because the DLD device (200-2) is to output the color green, the image processing unit (106) sends a "0" as the LSB such that the bit line logic (122) increases the gap voltage applied to the DLD device (200-2) from $V_1$ to $V_2$. The DLD device (200-2) now outputs light having the color green.

The preceding example is merely illustrative of the many different gap voltage levels that the bits in an n-bit control word may represent. Many alternatives exist. For example, the MSB in the preceding example may represent the gap voltage levels $V_1$ or $V_2$ and the LSB may represent the gap voltage levels $V_2$ or $V_3$. In this case, a bit value of "0" may represent the gap voltage level $V_1$ and a bit value of "1" may represent the gap voltage level $V_2$ for the MSB. Furthermore, a bit value of "0" may represent the gap voltage level $V_2$ and a bit value of "1" may represent the gap voltage level $V_3$ for the LSB. Hence, the image processing unit (106) may be configured to send a "1" as the MSB in a first frame and a "0" as the LSB in a subsequent frame to indicate that the final gap voltage level is to be equal to $V_3$.

In an alternative exemplary embodiment, the MSB in the preceding example may represent the gap voltage levels $V_0$ or $V_2$ and the LSB may represent the gap voltage levels $V_{1\ or\ V3}$. In this case, if the MSB represents $V_2$ and the LSB represents $V_1$, the bit line logic (122) first applies the gap voltage $V_2$ to the DLD device (200-2). When the LSB is sent, the bit line logic (122) then decreases the gap voltage applied to the DLD device from $V_2$ to $V_1$. Hence, as illustrated by the preceding examples, the bits in an n-bit control word may represent many different combinations of gap voltage levels.

Furthermore, the control word may include more than two bits according to an exemplary embodiment. Each bit represents one of two possible gap voltage levels. Each control bit that is sent to the bit line logic (122) subsequent to the MSB may indicate that the gap voltage level is to stay constant or that it is to be incrementally adjusted to a new gap voltage level.

The MSB may represent any two gap voltage levels according to an exemplary embodiment. In one exemplary embodiment, all of the possible gap voltage levels are placed in ascending order and the MSB represents one of the two lowest gap voltage levels (e.g., $V_0$ and $V_1$ in FIG. 4). In an alternative exemplary embodiment, the MSB represents one of the two lowest voltage levels greater than 0 volts (e.g., $V_1$ and $V_2$). In yet another exemplary embodiment, all the possible gap voltage levels are placed in descending order and the MSB represents one of the two highest gap voltage levels (e.g. $V_3$ and $V_2$ in FIG. 4). The MSB may also represent one of the two most frequently used gap voltage levels in a group of possible gap voltage levels. Likewise, the LSB may represent one of the two least frequently used gap voltage levels in a group of possible gap voltage levels.

Figure 6:
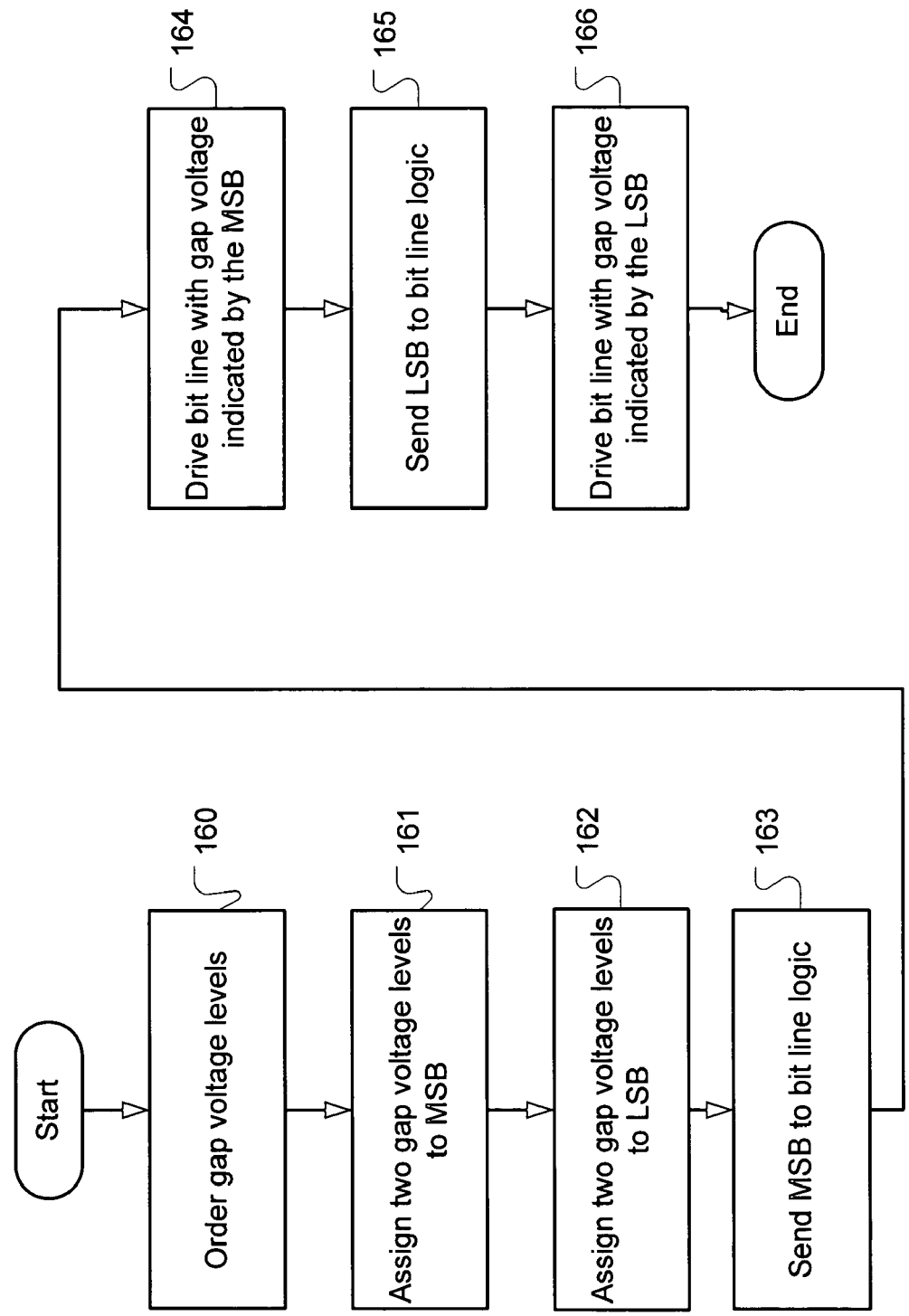
FIG. 6 is a flow chart illustrating an exemplary method of sending a 2-bit control word to the bit line logic in single bit planes according to one exemplary embodiment.

FIG. 6 is a flow chart illustrating an exemplary method of sending a 2-bit control word to the bit line logic (122) in single bit planes according to one exemplary embodiment. The flow chart shows a method of sending a 2-bit control word for illustrative purposes only and may be extended and/or modified to apply to the sending of any n-bit control word to the bit line logic (122) in single bit planes. First, all the possible gap voltage levels are placed in an order (step 160). The order may be an ascending order, descending order, most frequently used order, or any other order as best serves a particular application. Once the gap voltage levels are placed in an order (step 160), two of the gap voltage levels are assigned to the MSB (step 161). Any two of the possible gap voltage levels may be assigned to the MSB according to one exemplary embodiment. Likewise, two gap voltage levels may be assigned to the LSB (step 162). Any two of the possible gap voltage levels may be assigned to the LSB according to one exemplary embodiment. After the gap voltage levels have been assigned to the MSB and to the LSB, the MSB is sent to the bit line logic (step 163). The bit line logic drives a bit line with the gap voltage indicated by the MSB (step 164). The LSB is then sent to the bit line logic (step 165). The bit line logic may then adjust the charge on the bit line by driving the bit line with the gap voltage indicated by the LSB (step 166).

By sending the control word to the bit line logic (122) in single bit planes, the bit line logic (122) may have an increased amount of time to charge the bit lines (210) to the appropriate gap voltage levels. Furthermore, overall system power consumption may be decreased.

In one embodiment the image processing unit (106) may be configured to increase the overall data rate of the display system (100) by only sending a portion of the bits in the control word to the bit line logic (122). In other words, the image processing unit (106) may be configured to omit sending one or more of the bits in the control word to the bit line logic (122). For example, the image processing unit (106) may be configured to send only the MSB of a 2-bit control word the bit line logic (122) for one or more DLD devices (200) during a specified time period or frame. In this case, the LSB is not sent to the bit line logic (122).

In one embodiment, the image processing unit (106) may be configured to send an entire n-bit control word during a single frame or to send the n-bit control word one bit at a time over the span of multiple time frames. In one embodiment, a user of the display system (100) may select between these two methods of sending the n-bit control word. In an alternative embodiment, the image processing unit (106) may automatically select the best method of sending the n-bit control word as best serves a particular image that is to be displayed by the display system (100).

Figure 7:
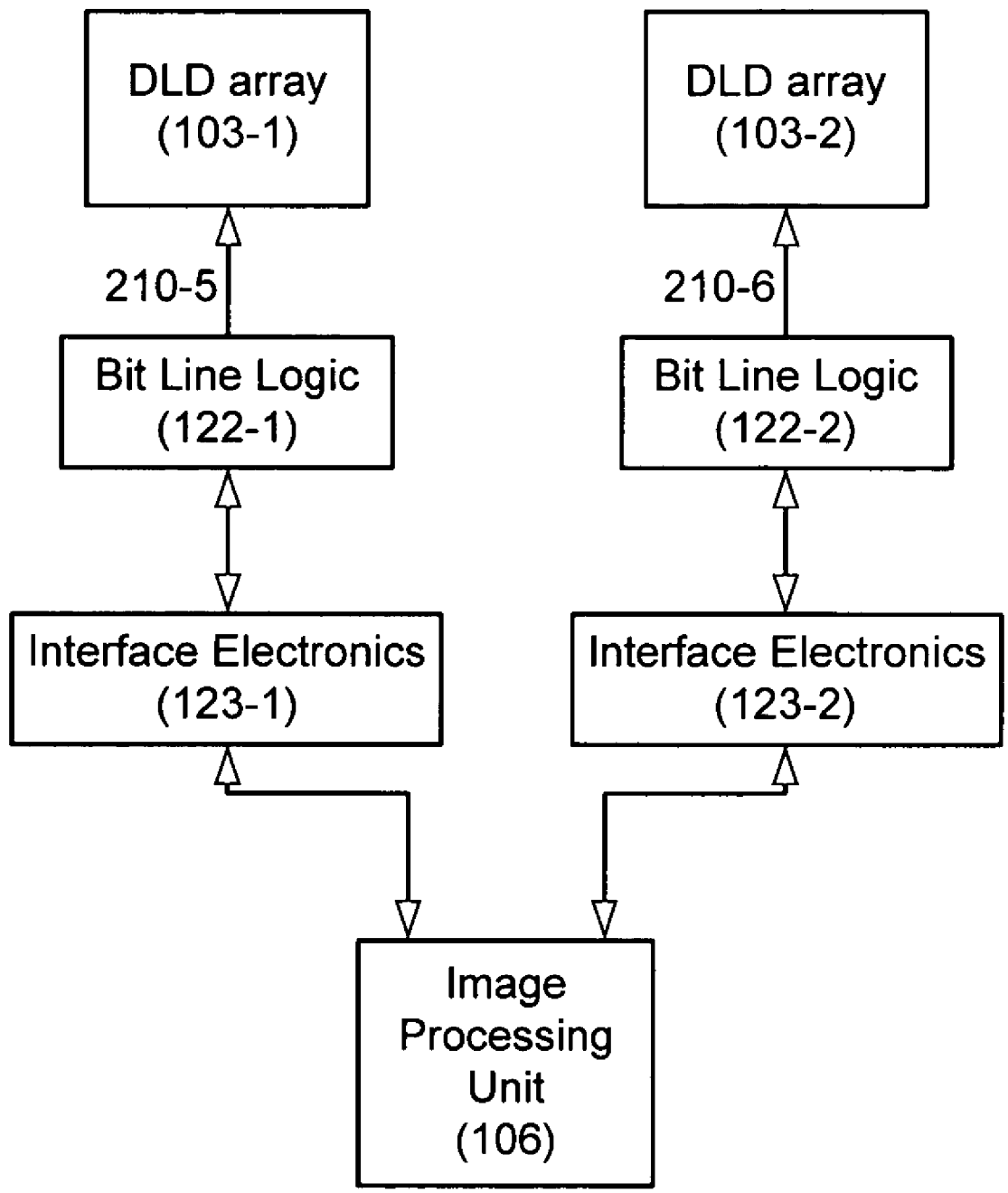
FIG. 7 illustrates that the image processing unit may be configured to send one or more of the bits in an n-bit control word to a first DLD array and send one or more of the bits in the n-bit control word to a second DLD array according to one exemplary embodiment.

FIG. 7 illustrates an alternative embodiment wherein the image processing unit (106) is configured to send one or more of the bits in an n-bit control word to a first DLD array (103-1) and send one or more of the bits in the n-bit control word to a second DLD array (103-2). The pixels generated by the first and second DLD arrays (103-1, 2) may be combined or superimposed on top of each other to render a pixel having color indicated by the n-bit control word. For example, the MSB of a two-bit word representing one of four colors may be sent to the bit line logic (122-1) associated with the first DLD array (103-1) and the LSB of the two-bit word may be sent to the bit line logic (122-2) associated with the second DLD array (103-2). In this case, the MSB may, for example, represent $V_1$ or $V_2$ and the LSB may represent $V_2$ or $V_3$. By sending the MSB to the first DLD array (103-1) and the LSB to the second DLD array (103-2), each of the bit line logic blocks (122-1,2) only has to receive one bit. Hence, in some applications, it may take only half the time to send an n-bit control word if the bits are split evenly between two DLD arrays (103-1, 2).

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method for use within an electromechanical system having at least one controllable diffractive light device, said method comprising:
   receiving an initial portion of a multi-bit control signal, said multi-bit control signal corresponding to a gap voltage level, said gap voltage level being specific to a desired wavelength of light and configured to cause said desired wavelength of light to be output by said controllable diffractive light device when illuminated by a light source; and
   prior to receiving a remaining portion of said multi-bit control signal, adjusting a gap voltage applied to said controllable diffractive light device based on said received initial portion of said multi-bit control signal.

2. The method of claim 1, wherein said electromechanical system includes a micro-electromechanical system (MEMS).

3. The method of claim 1, wherein said initial portion of said multi-bit control signal includes at least a most significant bit (MSB).

4. The method of claim 1, wherein said remaining portion of said multi-bit control signal includes at least a least significant bit (LSB).

5. The method of claim 1, wherein said initial portion of said multi-bit control signal is received during a first time frame and said remaining portion of said multi-bit control signal is received during a second time frame that is subsequent to said first time frame.

6. The method of claim 1, further comprising:
   after receiving said all of said multi-bit control signal, completing adjustment of said gap voltage applied to said diffractive light device based on said received multi-bit control signal.

7. A system for controlling a diffractive light device, said system comprising:
   bit line logic configured to receive an initial portion of a multi-bit control signal, said multi-bit control signal corresponding to a gap voltage level, said gap voltage level being specific to a desired wavelength of light and configured to cause said desired wavelength of light to be output by said diffractive light device when illuminated by a light source; and
   wherein, prior to receiving a remaining portion of said multi-bit control signal, said bit line logic adjusts a gap voltage applied to said diffractive light device based on said received initial portion of said multi-bit control signal.

8. The system of claim 7, wherein said initial portion of said multi-bit control signal includes at least a most significant bit (MSB).

9. The system of claim 7, wherein said remaining portion of said multi-bit control signal includes at least a least significant bit (LSB).

10. The system of claim 7, wherein said initial portion of said multi-bit control signal is received during a first time frame and said remaining portion of said multi-bit control signal is received during a second time frame that is subsequent to said first time frame.

11. The system of claim 7, wherein, after receiving said all of said multi-bit control signal, said bit line logic is further configured to complete adjustment of said gap voltage applied to said diffractive light device based on said received multi-bit control signal.

12. A system for use within an electromechanical system having at least one controllable diffractive light device, said system comprising:
   means for receiving an initial portion of a multi-bit control signal, said multi-bit control signal corresponding to a gap voltage level, said gap voltage level being specific to a desired wavelength of light and configured to cause said desired wavelength of light to be output by said controllable when illuminated by a light source; and
   prior to receiving a remaining portion of said multi-bit control signal, means for adjusting a gap voltage applied to said diffractive light device based on said received initial portion of said multi-bit control signal.

13. The method of claim 6, wherein said adjusting said gap voltage prior to receiving said remaining portion of said multi-control bit signal and said completing adjustment of said gap voltage are performed sequentially, but rapidly enough that a human viewer perceives only wavelength our output light corresponding to said gap voltage level specified by said complete multi-bit control signal.

14. The method of claim 1, further comprising:
   transmitting each bit of said multi-bit control signal separately and in sequence; and
   incrementally adjusting said gap voltage upon receipt of each said bit.

15. The method of claim 1, further comprising:
   ordering a series of gap voltage levels, each corresponding to a separate wavelength of light to be output; and
   assigning two of said gap voltage levels to a most significant bit (MSB) of said multi-bit control signal.

16. The method of claim 15, further comprising two different gap voltage levels of said series of gap voltage levels to a least significant bid (LSB) of said multi-bit control signal.

* * * * *

UNITED STATES PATENT AND TRADEMARK OFFICE
CERTIFICATE OF CORRECTION

PATENT NO. : 7,436,389 B2  Page 1 of 1
APPLICATION NO. : 10/903537
DATED : October 14, 2008
INVENTOR(S) : Eugene J. Mar It is certified that error appears in the above-identified patent and that said Letters Patent is hereby corrected as shown below:

In column 10, line 23, in Claim 12, after "controllable"
insert -- diffractive light device --.

In column 10, line 32, in Claim 13, delete "our" and insert -- of --, therefor.

Signed and Sealed this

Fifth Day of January, 2010

David J. Kappos
*Director of the United States Patent and Trademark Office*